United States Patent [19]

Raymond, III

[11] Patent Number: 5,336,751
[45] Date of Patent: Aug. 9, 1994

[54] PREPARATION OF COPOLYCARBONATE FROM RESORCINOL

[75] Inventor: Paul C. Raymond, III, Evansville, Ind.

[73] Assignee: General Electric Company, Mass.

[21] Appl. No.: 863,918

[22] Filed: Apr. 6, 1992

[51] Int. Cl.$^5$ ............................................. C08G 64/24
[52] U.S. Cl. ................................... 528/204; 528/196; 528/198
[58] Field of Search ....................... 528/204, 196, 198

[56] References Cited

U.S. PATENT DOCUMENTS

| | | | |
|---|---|---|---|
| 3,879,347 | 4/1975 | Serini et al. | 528/204 |
| 3,989,672 | 11/1976 | Vestergaard | 260/47 |
| 4,055,544 | 10/1977 | Baggett | 260/47 |

FOREIGN PATENT DOCUMENTS

| | | |
|---|---|---|
| 971777 | 3/1959 | Fed. Rep. of Germany . |
| 0508774A2 | 4/1992 | Japan . |
| 0508775A3 | 4/1992 | Japan . |

OTHER PUBLICATIONS

Chemistry and Physics of Polycarbonates by Hermann Schnell, Jun. 1964, pp. 33–41, 66–73, Interscience, New York.

Chemistry and Physics of Polycarbonates by Herman Schnell pp. 66–73, 1964.

Primary Examiner—Harold D. Anderson

[57] ABSTRACT

A composition comprising a block aromatic copolycarbonate having from about 2 to 30 mole % of the total repeating carbonate units derived from resorcinol.

6 Claims, No Drawings

PREPARATION OF COPOLYCARBONATE FROM RESORCINOL

BACKGROUND OF THE INVENTION

Aromatic polycarbonates are well known for their excellent properties. However it has always been a goal of workers in the area to prepare polycarbonates which retain as many of the excellent properties of aromatic polycarbonates to as great extent as possible, particularly the properties of bisphenol-A polycarbonate, while improving the melt flow of the polymer. A significant amount of the work in this area has focused on the introduction of certain comonomers into the structure to bring about such desired effects. For example copolyestercarbonates having aliphatic ester groupings have significantly improved flow but also display decreased thermal properties compared to the polycarbonate.

A novel copolycarbonate has been discovered which has substantially increased flow together with high thermal stability. This is achieved without introducing aliphatic repeating units into the polymer. The composition is a block copolymer and is prepared by standard interfacial techniques.

SUMMARY OF THE INVENTION

In accordance with the invention there is provided a composition comprising a block copolycarbonate having from about 2 to 30 mole % of the total repeating carbonate units derived from resorcinol.

Another aspect of the invention is preparing the inventive composition under interfacial reaction conditions.

Color improvement of the final composition is obtained by purging with an inert gas such as nitrogen each of the reaction formulation chemicals for an appropriate time, either alone or together as the formulation mixture prior to reaction with the carbonate precursor and/or maintaining a neutral pH, about 6 to 8 until the beginning of the carbonation reaction.

DETAILED DESCRIPTION OF THE INVENTION

Resorcinol has been mentioned as a possible monomer or comohomer for aromatic polycarbonates for many years. However the only aromatic polycarbonate which has been made to date having resorcinol therein appears to be a 50-50 mole % copolycarbonate of resorcinol and bisphenol-A reported at page 68 of Schnell, Chemistry and Physics of Polycarbonates, Interscience Publishers, 1964. However, no properties are reported except for its melting range and Tg. The block copolycarbonates of this invention have excellent melt flow together with the retention to a great extent of other important properties of polycarbonates, as well as high thermal stability. In polymer terminology a random copolymer structure is dependent upon the mole fraction of the various comonomers. A block copolymer has a greater number of a single monomer grouped together in a block.

The dihydric phenols other than resorcinol which can be used in the block copolycarbonate of this invention may be represented by the general formula.

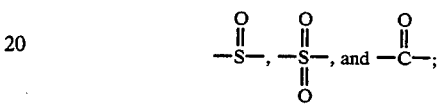

wherein:

R is independently selected from halogen, monovalent hydrocarbon, and monovalent hydrocarbonoxy radicals;

$R^1$ is independently selected from halogen, monovalent hydrocarbon, and monovalent hydrocarbonoxy radicals;

W is selected from divalent hydrocarbon radicals, $-S-$, $-S-S-$, $-O-$, $$-\overset{O}{\underset{O}{\overset{\|}{S}}}-,\ -\overset{O}{\underset{\|}{S}}-,\ \text{and}\ -\overset{O}{\underset{\|}{C}}-;$$

n and $n^1$ are independently selected from integers having a value of from 0 to 4 inclusive; and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by R and $R^1$ are chlorine and bromine.

The divalent hydrocarbon radicals represented by W include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms. The monovalent hydrocarbonoxy radicals represented by R and $R^1$ may be represented by the formula—$OR^2$ wherein $R^2$ is a monovalent hydrocarbon radical of the type described hereinafore. Preferred monovalent hydrocarbonoxy radicals are the alkoxy and aryloxy radicals.

Some illustrative non-limiting examples of the dihydric phenols falling within the scope of Formula II include:

2,2-bis(4-hydroxyphenyl)propane (bisphenol-A);
2,2-bis (3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis( 3,5-dimethyl-4-hydroxyphenyl )cyclododecane;
4,4-dihydroxydiphenyl ether;
4,4-thiodiphenol;
4,4-dihydroxy-3,3-dichlorodiphenyl ether; and 4,4-dihydroxy-2,5-dihydroxydiphenyl ether.

Other useful dihydric phenols which are also suitable for use in the preparation of the above polycarbonates are disclosed in U.S. Pat. Nos. 2,999,835; 3,028,365; 3,334,154; and 4,131,575, all of which are incorporated herein by reference.

The carbonate precursor utilized in the invention can be any of the standard carbonate precursors such as phosgene, and the like. While using an interfacial process it is also preferred to use a standard catalyst system well known in the synthesis of polycarbonates. A typical catalyst system is that of an amine system such as tertiaryamine, amidine or guanidine. Tertiary amines are generally employed in such reactions. Trialkylamines such as triethylamine are generally preferred.

In order to control molecular weight, it is standard practice to utilize a chain stopping agent which is a monofunctional compound. This compound when reacting with the appropriate monomer provides a nonreactive end. Therefore the quantity of chain stopping compound controls the molecular weight of the polymer. Bulkier chain terminators than phenol should provide substantially better retention of physical properties such as impact. Examples of these bulkier substituents include paratertiarybutylphenol, isononyl phenol, iso-octyl phenol, cumyl phenols such as meta and paracumyl phenol, preferably paracumyl phenol, as well as chromanyl compounds such as Chroman I.

The weight average molecular weight of the copolycarbonate can generally vary from about 10,000 to about 100,000 as measured by GPC, using a polystyrene standard corrected for polycarbonate. A preferred weight average molecular weight is from about 14,000 to about 40,000.

The block copolymer is made under standard interfacial conditions. These conditions have been described in numerous publications including the patents previously mentioned in this document which are herein incorporated by reference. Essentially, an aqueous alkaline salt solution of the dihydric phenol is contacted with an organic solvent in which the ensuing polycarbonate is soluble, such as methylene chloride, ethylene dichloride, chloroform, preferably methylene chloride, together with a carbonate precursor, preferably phosgene, with mixing of the two phases. Also generally present are a catalyst system and a chain terminator. The polycarbonate is isolated from the organic phase.

It has been found that in preparing this particular composition that color of the polymer can be improved by the purging of the formulation mixture and particularly the reactant resorcinol as well as BPA with an inert gas such as nitrogen, carbon dioxide, argon and the like, preferably nitrogen for an appropriate time period, at least about 1 minute and generally from about 5 to 30 minutes. This can be conveniently done in the reaction vessel wherein all the reactants and solvents are included immediately prior to the addition of the carbonate precursor, preferably phosgene.

As a separate step in addition to or in lieu thereof for improving color, the formulation mixture is maintained at an essentially neutral pH, about 6–8 until the beginning of the addition of the carbonate precursor or the catalyst, whichever occurs first.

The polymers of this invention are block copolycarbonates. These polymers have a resorcinol content of from about 2 to 30 mole percent based on the total dihydric phenol present in the copolymer, preferably about 5 to 20 mole percent resorcinol. As well as having the advantages previously mentioned and demonstrated in the examples below, the polymers should also have increased flame retardance compared to copolyestercarbonates having aliphatic ester repeating units.

Below are the exemplified compositions of this invention. These examples are intended to illustrate and are not included to narrow the generic nature of the invention.

Experimental Procedure

Into a reactor was placed:
Methylene chloride=500 ml
$H_2O$=400 ml
Phenol=0.3 mole % of dihydric phenol
BPA+resorcinol=0.25 moles The formulation was purged with nitrogen for fifteen (15) minutes while being maintained at a neutral pH (6 to 8). 2 mole % of triethylamine catalyst was quickly added to the reactor while raising the pH to a level of 9.5. Phosgene was then immediately blown into the reactor to a quantity of 0.325 moles over a time period of sixteen (16) minutes at a steady rate, the first half of the phosgene was added while maintaining the pH at about 10, the second half while maintaining the pH at about 10.5. Constant stirring of the reactor contents occurred during the entire reaction.

The brine and organic phase were then separated. The organic phase was washed four (4) times with dilute HCl (2%) and four (4) times with deionized water. The polymer was precipitated using hot water under high shear.

Physical properties of the polymers are shown below with the following abbreviations and test explanations.
RS is resorcinol.
Mw and Mn are determined by GPC against polystyrene standard with a polycarbonate correction.
Tg is measured by DSC.
Td5 is decomposition temperature at 5% weight loss and is measured by thermal gravimetric analysis.
MVI is melt viscosity index.
ΔMw 300° C. tail is a test utilized to show thermal stability and is the percent change in Mw occurring due to the MVI test at 300° C.

| Example # | Reaction RS Mole % | HPLC RS Mole % | Mw ×1000 | Mn ×1,000 | Mw/Mn | Tg °C. | Td5 °C. | MVIcc/10 min 250° C. | 280° C. | 300° C. | ΔMw 300° C. Tail % |
| --- | --- | --- | --- | --- | --- | --- | --- | --- | --- | --- | --- |
| Control | 0 | 0 | 27.6 | 10.5 | 2.61 | 150 | 440 | 2.2 | 6.5 | 15.0 | −4.4 |
| 1 | 10 | 8.0 | 26.0 | 9.3 | 2.80 | 144 | 427 | 2.9 | 9.9 | 21.2 | −2.6 |
| 2 | 20 | 17.1 | 24.6 | 8.0 | 3.06 | 137 | 427 | 4.2 | 17.8 | 39.9 | −2.8 |

As is clearly demonstrated by the data the Tg is somewhat reduced by the addition of resorcinol. However the processability of the polymer as measured by MVI is markedly increased even though resorcinol is an aromatic moiety. Finally and of great significance and unpredictable is the fact that the thermal stability of the copolymer as measured by ΔMw 300° C. tail, is increased over the BPA homopolycarbonate.

What is claimed is:

1. A process for preparing an aromatic copolycarbonate having from about 2 to 30 mole % of the total repeating carbonate units derived from resorcinol which comprises reacting a dihydric phenol and resorcinol with a carbonate precursor under interfacial conditions wherein the amount of said resorcinol is sufficient to provide from about 2 to 30 mole % resorcinol derived carbonate units of the total carbonate units, and wherein said dihydric phenol and said resorcinol are a reaction formulation which is purged with an inert gas prior to reaction with the carbonate precursor.

2. The process of claim 1 wherein the dihydric phenol and resorcinol are a reaction formulation and the reaction formulation is purged with an inert gas prior to reaction with the carbonate precursor.

3. The process of claim 1 wherein the process further comprises the addition of a catalyst, the dihydric phenol and resorcinol are a reaction formulation and the reaction formulation is maintained at a pH of about 6 to 8 prior to addition of catalyst and carbonate precursor.

4. The process of claim 1 wherein the process further comprises the addition of a catalyst, the dihydric phenol and resorcinol are a reaction formulation and the reaction formulation is maintained at a of about 6 to 8 prior to addition of catalyst and carbonate precursor.

5. The process of claim 1 wherein the inert gas is nitrogen.

6. The process of claim 2 wherein the inert gas is nitrogen.

* * * * *